United States Patent
Lubnin et al.

(10) Patent No.: US 9,682,586 B2
(45) Date of Patent: Jun. 20, 2017

(54) AQUEOUS CATIONIC POLYURETHANE DISPERSIONS

(71) Applicant: Lubrizol Advanced Materials, Inc., Cleveland, OH (US)

(72) Inventors: Alexander V. Lubnin, Copley, OH (US); Dennis N. Malaba, Uniontown, OH (US)

(*) Notice: Subject to any disclaimer, the term of this patent is extended or adjusted under 35 U.S.C. 154(b) by 0 days.

(21) Appl. No.: 15/358,901

(22) Filed: Nov. 22, 2016

(65) Prior Publication Data

US 2017/0072728 A1    Mar. 16, 2017

Related U.S. Application Data

(62) Division of application No. 13/881,919, filed as application No. PCT/US2011/058281 on Oct. 28, 2011, now Pat. No. 9,527,328.

(60) Provisional application No. 61/407,932, filed on Oct. 29, 2010.

(51) Int. Cl.

| | |
|---|---|
| *B41M 5/00* | (2006.01) |
| *B41M 5/52* | (2006.01) |
| *B41M 5/50* | (2006.01) |
| *C09D 175/08* | (2006.01) |
| *C08K 3/20* | (2006.01) |
| *C08J 3/00* | (2006.01) |
| *C08L 75/00* | (2006.01) |
| *D21H 13/00* | (2006.01) |
| *D21H 11/00* | (2006.01) |

(52) U.S. Cl.
CPC ........... *B41M 5/52* (2013.01); *B41M 5/508* (2013.01); *B41M 5/5245* (2013.01); *B41M 5/5281* (2013.01); *C08J 3/00* (2013.01); *C08K 3/20* (2013.01); *C08L 75/00* (2013.01); *C09D 175/08* (2013.01); *D21H 11/00* (2013.01); *D21H 13/00* (2013.01)

(58) Field of Classification Search
CPC   B41M 5/5281; C08J 3/00; C08K 3/20; C08L 75/00; D21H 11/00; D21H 13/00
See application file for complete search history.

(56) References Cited

U.S. PATENT DOCUMENTS

| | | | |
|---|---|---|---|
| 6,140,412 A | 10/2000 | Saitoh et al. | |
| 9,527,328 B2* | 12/2016 | Lubnin | ............... C08F 283/006 |
| 2003/0083393 A1* | 5/2003 | Kiso | .................. C08G 18/1808 521/131 |
| 2004/0002570 A1* | 1/2004 | Parrinello | ................ B41M 5/52 524/507 |
| 2008/0009049 A1 | 1/2008 | Viksoe-Nielsen et al. | |
| 2008/0119628 A1 | 5/2008 | Wada et al. | |

FOREIGN PATENT DOCUMENTS

DE    4415292 A1    11/1995

OTHER PUBLICATIONS

V. Sriram and Ganga Radhakrishnan, Novel Short-chain Cross-linked Cationomeric Polyurethanes, , Jul. 14, 2005, Advanced Centre in Polymers, Central Leather Research Institute, Adyar, Chennai-600 020, India.

* cited by examiner

*Primary Examiner* — Betelhem Shewareged
(74) *Attorney, Agent, or Firm* — Samuel B. Laferty; Teresan W. Gilbert

(57) ABSTRACT

An aqueous cationic polyurethane dispersion for waterborne digital print and other applications comprising an aqueous dispersion of polyurethane having properly positioned tertiary amino groups, e.g., tethered tertiary amino group separated from backbone by at least two intervening atoms or terminal tertiary amino groups with multiple tertiary amino groups per terminus, where said amino groups are optionally partially quaternized and/or neutralized.

11 Claims, No Drawings

AQUEOUS CATIONIC POLYURETHANE DISPERSIONS

CROSS REFERENCE TO RELATED APPLICATION

This application is a divisional application, claiming the benefit of U.S. application Ser. No. 13/881,919 filed Aug. 16, 2013, claiming the benefit of PCT Application No. PCT/US11/058,281 filed Oct. 28, 2011 which claims the benefit of U.S. Provisional Application No. 61/407,932 filed Oct. 29, 2010.

FIELD OF INVENTION

The invention relates to the composition and manufacture of aqueous cationic polyurethane dispersions (PUDs), wherein the dispersability and performance of the polyurethanes are enhanced by tertiary amino groups, e.g., tethered tertiary amine groups (amine groups in the side chain) or terminal tertiary amino groups with multiple tertiary amino groups per terminus, optionally neutralized and/or quaternized. Such dispersions are useful in various applications, including digital printing, ink receptive substrates, paper and fiber glass sizing, coatings, adhesives, packaging, medical articles, personal care items and household care items.

BACKGROUND OF THE INVENTION

Digital printing, including inkjet and laser, is a method of reproducing an image or data onto a medium directly from a computer. Both allow for instant development and fixation of data or an image. Although there are many advantages, there are also some issues with using digital technology, including problems such as poor water resistance (referred to as blotching of the dye), color retention, and yellowing of blank areas. Another key factor in image quality is absorption, or how the liquid ink is incorporated into the solid media, and how it plays a role in the appearance of final data or image. When the ink is applied onto the media, it should stay in a tight, symmetrical dot; otherwise the dots of the ink will begin to feather, or spread out in an irregular fashion to cover a slightly larger area than the digital printer intended. The result is an image or data that appears fuzzy, especially at the edges of objects and text, which is also called wicking. Efforts at improving these potential issues have been made.

EP 1068959A1 discloses cationic polyurethane resin with tertiary amines in the backbone and with said amines quaternized by diethyl sulfate or neutralized with acetic acid. No polyols were used, and resulting polymers were soluble in water and were produced as solvent-containing aqueous solutions with low solids content (20 to 30% wt). FR 2,934,777 relates to polyurethane compositions that can be cationic or can be made cationic. It also relates to cosmetic treatment processes using said polyurethane.

U.S. Pat. No. 6,140,412, discloses aqueous cationic polyurethane solutions for waterproofing ink-jet receptive coatings wherein tertiary amino groups in the backbone were neutralized with acetic acid. Only very low molecular weight products were obtained (weight-average molecular weight of less than 8,000 g/mol) in the form diluted (total solids of less than 20% wt.) aqueous solutions containing dimethylformamide solvent.

U.S. Pat. No. 6,358,306 discloses hydrophilic polymers, including polyurethanes, containing tertiary amine groups, including in the side chain, which are not neutralized or quaternized. Because water-soluble polyethylene glycol polyol is used in the synthesis, the demonstration of the invention is limited to polymerization in organic solvents and the final products are polymer solutions in organic solvents. The unique feature of tethered amines for waterborne products was not foreseen and demonstrated.

US 2008090949 directs to the cationic polyurethane dispersions in which tertiary amine group is introduced through a reaction product of diepoxy compound with secondary amine. The limitations of this approach are that the target tertiary nitrogen is removed from the backbone by only one carbon atom and the anchoring atom of the backbone, to which the tether is attached, can only be a carbon and can not be another nitrogen. Additional significant hurdles in implementation of this route are that it requires an extra synthesis step and, in order to obtain maximum dispersability, the most preferred alkyl groups in secondary amine would need to be methyls; this would require handling at elevated temperatures (70° C.) of harmful and highly flammable dimethylamine which has boiling point=7° C. and forms explosive mixtures with air. For this reason, the reduction to practice in US 2008090949 was limited to dibutylamine.

SUMMARY OF THE INVENTION

The present invention is directed towards an aqueous cationic polyurethane dispersion comprising an aqueous dispersion of a polyurethane having tertiary amino groups attached to urethane in locations to optimize interaction of the amino groups with an aqueous media such as a) tethered tertiary amino group(s) laterally attached to the urethane backbone or b) terminally attached tertiary amino groups containing multiple tertiary amino groups, wherein said amino groups are optionally neutralized with an acid and/or quaternized and wherein tethered is interpreted to indicate that the group containing the tertiary amine is laterally pendant from the urethane backbone and said tertiary amine groups is separated from said urethane backbone by at least two intervening atoms, such as selected from the group consisting of carbon, nitrogen, oxygen and preferably carbon.

Specifically, the present invention is directed towards environmentally friendly (i.e., with substantially low solvent content) aqueous cationic preferably high-molecular-weight polyurethane dispersion with high content of solids and low viscosity.

The dispersions can be used for ink receptive coatings (e.g., receptive coatings for ink jet ink) having superior properties, such as reduced wicking, enhanced abrasion resistance, undistorted colors and fast drying rate. Other useful properties of the urethanes of the present invention include affinity to anionic substrates and compatibility as a dispersion in water with cationic substances and multivalent metal ions which are often used as auxiliary aids in digital printing and other mentioned herein applications.

DETAILED DESCRIPTION OF THE INVENTION

Definitions

The following terms have definitions as stated below:
Tethered amine group refers to a location of the amine group away from the main polymer backbone. In such an arrangement, multiple amine groups are connected with the said backbone via a spacer. This topology can be represented by the following diagram:

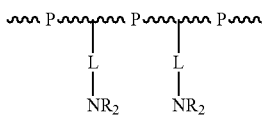

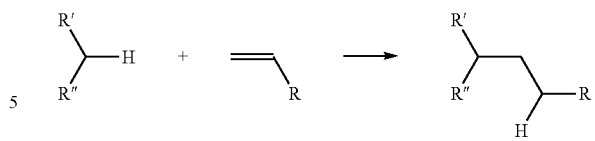

where P designates a urethane polymer backbone, L is a link or spacer, and NR$_2$ is tethered tertiary amine which can be either neutralized with an acid or quaternized. Each R is generally independently of the other a lower alkyl group (e.g., 1 to 5 carbons atoms, preferably 1 or 2 carbon atoms) or an alkyl amine which can include another tertiary amine group. Each L can be a linking group (substituted, linear, branched, cycloalkyl, aromatic, or combinations thereof which can include urethane linkages, ester linkages, and in addition to carbon can contain heteroatoms such as oxygen and nitrogen). In a preferred and simple embodiment, L is generally ethylene, propylene or other alkylene groups of 2 to 6, preferably 2 to 4, and most preferably 2 or 3 carbon atoms.

A subset to this topology referred hereafter as terminal tertiary amino groups (being other than tethered tertiary amino groups) can be represented by the following diagram:

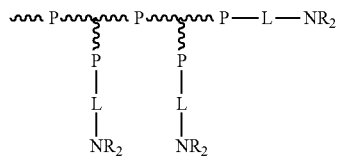

In this arrangement, amine groups are attached to the chain ends of the branched polymer. In this embodiment L and R are as defined above for the tethered tertiary amino group.

The term "tethered" herein is synonymous to terms "laterally attached", "pendant" and "side-chain groups" which are equally used in the technical literature. These laterally attached tertiary amine groups can be optionally neutralized and/or quaternized.

Polyurethane is a term used to describe polymers including oligomers (e.g., prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocynaurate, uretdione, ester, ether, carbonate, hydrocarbon, fluorocarbon, alcohol, mercaptan, amine, hydrazide, siloxane, silane, ketone, olefin, etc., in addition to urethane groups.

Final polyurethane product refers to the form of the polyurethane in the aqueous dispersion product of this invention. Where the polyurethane prepolymer is optionally chain extended, the final polyurethane product is this chain extended polymer. Where the polyurethane prepolymer is not chain extended, the final polyurethane product is the prepolymer itself.

Michael Addition is the nucleophilic addition of a carbanion or another nucleophile to an unsaturated carbonyl compound:

Weight % means the number of parts by weight of ingredient per 100 parts by weight of composition or material (often per 100 parts by weight of urethane polymer or oligomer) of which the ingredient forms a part. All units will be in weight % unless otherwise stated.

Aqueous describes a composition containing a substantial amount of water. Preferably aqueous will mean at least 20 wt. % water and in a more preferred embodiment it will be at least 50 wt. % water based on water and other solvents. It may contain other ingredients such as compatible organic solvents as well. Thus, if we say aqueous polyurethane dispersion, we will mean in a preferred embodiment that the polyurethane is dispersed in a liquid media that is at least 20 wt. % water and can contain compatible organic materials such as alcohol and other polar organic solvents.

Substantial absence of water refers to compositions formed without the intentional addition of any significant amount of water, e.g., about 2 wt. % or less or so based on the total weight of the composition. Typically, the reaction of isocyanates with polyols is conducted in the substantial absence of water as water can separately react with isocyanates to form less desirable and less controlled structures.

Substantial absence of surfactant means that the dispersion is made without intentionally including any significant amount of surfactant (often defined as surface active species of less than 200 Mn) for suspending or dispersing the dispersed phase of the dispersion. This often occurs when there are sufficient tethered tertiary amino groups and/or nonionic dispersants attached to the polyurethane backbone to allow the polyurethane to be self-dispersible in water.

Polymer backbone is a continuous interconnected sequence of atoms between the first atom of the first repeating unit and the last atom of the last repeating unit. Atoms which are pendant from the backbone such as the methyl groups in TDI or poly-(1,2-propylene oxide) will be considered as pendant moieties and not backbone atoms.

The present invention is directed to cationic polyurethane dispersions for use in waterborne digital print applications wherein tethered amines have been incorporated into urethane. Without limiting the scope of the invention, we theorize that tethered tertiary amines are more effective dispersing monomers than in-chain amines because the amine group is removed away from the backbone allowing for better hydration. This is also hypothesized to be true for multiple tertiary amino groups in a terminal position on the urethane. For the same reason, these amine groups have higher degree of mobility and they are more readily accessible for interaction with anionic ingredients in the intended applications. Spacers, which are longer than one atom, are particularly preferred when tethered amine monomer becomes a part of the hard segment. Strong hydrogen bonding and van-der-Waals interactions can entrap the tertiary amine, so longer spacers allow for tertiary amine to move away from the hard segment domain and become more mobile and accessible for interactions. An important subclass of the tethered amines is the monomers with more than one tertiary amine groups in one molecule. Diamines are more effective dispersing monomers than mono amines because they can carry higher local charge density.

There are two ways to impart the cationic charge: Neutralization by acids and quaternization by organic halides, sulfates and oxiranes (epoxides). Unlike neutralization, quaternization is permanent. Salt formation with acids is reversible especially if the acid is volatile (e.g., acetic or hydrochloric acid). The amine salts reverts back to unneutralized form during drying, and the polymer becomes water resistant, providing superior performance.

Polyurethanes

Polyurethanes of this invention are formed from at least one polyisocyanates and at least one NCO-reactive compound.

Any compound that provides a source of active hydrogen for reacting with isocyanate groups via the following reaction: —NCO+H—X→—NH—C(=O)—X, can be used as the NCO-reactive compound in this invention. Examples include but are not limited to polyols, polythiols and polyamines.

Isocyanates

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred, but even monofunctional isocyanates can be used, for example, as molecular-weight controlling agents.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, lysine diisocyanate and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, isophorone diisocyanate, cyclohexane diisocyanate, bis-(isocyanatomethyl) cyclohexane, methylcyclohexane diisocyanate, cyclohexane triisocyanate, their isomers and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include diphenylmethylene diisocyanate, toluene diisocyanate, phenylene diisocyanate, naphthalene diisocyanate, tetrahydronaphthalene diisocyanate, biphenylene diisocyanate, dimethyl biphenylene diisocyanate, dichloro biphenylene diisocyanate, triphenyl methane triisocyanate, their isomers, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Dimers, trimers, and oligomers of the above mentioned isocyanates may also be used. Examples include polymeric MDI.

Isocyanates can be used alone or in combination of two or more.

NCO:OH Ratio

Normally, the prepolymer produced in the present invention will be isocyanate-terminated. For this purpose, the ratio of isocyanate equivalents to active hydrogen in the prepolymer typically ranges from about 1.3/1 to about 2.5/1, preferably from about 1.5/1 to about 2.1/1, and more preferably from about 1.7/1 to about 2/1.

An OH-terminated prepolymer can also be made if desired. In this case, an access of OH equivalents over NCO is used.

Tethered Monomers

Cationic polyurethanes contain cationic centers built into and/or attached to the backbone. Such cationic centers include ammonium, phosphonium and sulfonium groups. These groups can be incorporated into the polymer in the ionic form or, optionally, they can be generated by post-neutralization or post-quaternization of corresponding nitrogen, phosphorous, or sulfur moieties. The combination of all of the above groups can be used as well as their combination with nonionic stabilization. Anionic groups also can be incorporated into the polymer producing zwitterionic compositions.

In one embodiment, a cationic center is derived from reacting into the polyurethane (through conventional isocyanate reactions with isocyanate-reactive groups on the tertiary amine groups) one or more compounds having tethered tertiary amino group such that, when said compound is incorporated into the polyurethane, the tethered tertiary nitrogen atom is separated by at least two atoms (more preferably at least three atoms) from the closest atom of the polyurethane backbone.

In one embodiment, it is preferred that compounds having tethered tertiary amino group contain on average two reactive groups which can participate in building polyurethane of the present invention.

Examples of preferred tethered amine monomers include 1,1'-{[3-(dimethylamino)propyl]imino}-bis-2-ethanol, 1,1'-{[3-(dimethylamino)propyl]imino}-bis-2-propanol (Jeffcat® DPA from Hunstman) and N,N-bis-(2-hydroxyethyl)-isonicotinamide (BIN):

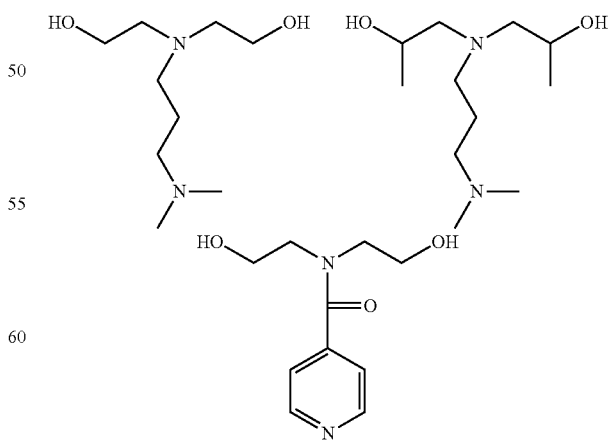

Monomers with tethered amines or quaternary salts can be made by reacting tertiary amines or quaternary ammonium salts, which contain NCO-reactive groups, with diisocyanates followed by reaction with dialkanolamine. For example, by reacting TD1 with 2-dimethylaminoethanol followed by reaction with diethanolamine, the following monomer can be obtained:

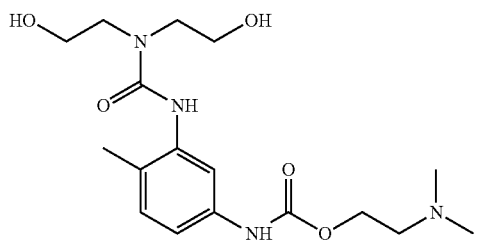 [SMILES: Cc1ccc(NC(=O)OCCN(C)C)cc1NC(=O)N(CCO)CCO]

Examples of dialkylamino derivatives suitable for this route include dialkylaminoethanol, dialkylaminopropanol, 2-dimethylamino-2-methyl-1-propanol, N,N-dialkyl propylenediamine, N,N-dialkyl hexamethylenediamine and amines available from Huntsman under Jeffcat® trade name such as ZF-10, Z-110, ZR-50:

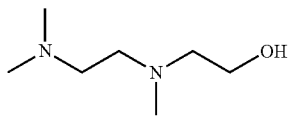

-continued

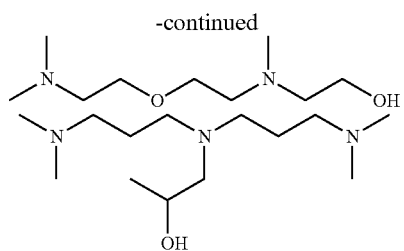

This route can benefit from using asymmetric diisocyanates such as TDI and IPDI with different reactivities of two isocyanate groups which allows for increased selectivity of the first and the second stages.

In one embodiment, the cationic centers (either in part or in total) are derived from terminal groups of the polyurethane having tertiary nitrogen groups (optionally quaternized or neutralized with an acid). While not wishing to be bound by hypothesis, it is hypothesized that terminal tertiary nitrogen groups will not provide as much colloidal stabilization and options for colloidal stabilization as tethered tertiary nitrogen groups. However, it was noticed that some desirable adhesive properties (such as blocking resistance to itself but adhesion to neutral or anionically charged surfaces) were exhibited by urethane polymers with terminal rather than tethered tertiary amino groups. In a preferred and claimed embodiment, a urethane polymer is formed with at least 0.1, 0.2, 0.3, or 0.4 up to 10, 8, 5, 4, 2, or 1 milliequivalents/gram of polyurethane of terminal tertiary amino groups wherein at least 25, 35, 50, 75, or 80% of the terminal tertiary amino groups comprise at least two tertiary amino groups per chain end. These are particular effective as they provide more cationic charge per milliequivalent or gram of compound providing tertiary amino groups.

The mono alcohols shown above can be used directly in the polyurethane synthesis in which case the tertiary nitrogen groups become polymer chain ends (terminal).

In place of dialkanolamines, asymmetric dialkyl diaminoalkylenes can be used producing tethered amine urethaneurea monomers. Examples include dimethylaminopropylamine and dimethylaminohexylamine.

Tethered amines can be incorporated into polyurethane as part of an isocyanate monomer. The latter can be obtained by reacting the above mentioned dialkylamino monoalcohols and monoamines with di-, tri- and polyisocyanates. For example, by reacting HDI trimer with 2-dimethylamino-2-methyl-1-propanol (DMAMP) the following diisocyanate can be obtained:

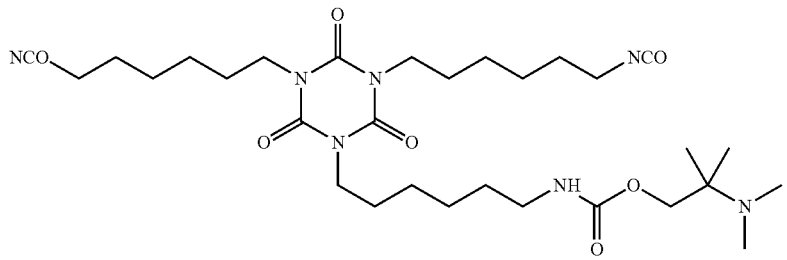

Monomers with tethered amines or quaternary salts can also be made via Michael addition of suitable amines such as diethanolamine onto acrylic monomers. Examples of monomers with tertiary amino groups are N,N-dimethylamino ethyl methacrylate (DMAEMA; Mhoromer® BM 601 from Evonik); 3-dimethylamino-2,2-dimethyl-propyl methacrylate (DMADMPMA), and N,N-dimethylaminopropyl acrylamide. They can be converted into a cationic monomer at desired point by neutralization and/or quaternizing.

Examples of cationic monomers suitable for Michael addition are:
  N,N-dimethylaminoethyl methacrylate—methyl chloride quaternary salt (Ciba's AGEFLEX® FM1Q80MC or Evonik's MHOROMER® BM 606)
  N,N-dimethylaminoethyl acrylate—methyl chloride quaternary salt (AGEFLEX® FA1Q80MC)
  Methacryloxyethyltrimethylammonium methylsulfate (AGEFLEX® FA1Q80DMS.)
  N,N-Dimethylaminopropyl acrylamide—methyl chloride quaternary salt
Phosphine analogs may also be used if available.

Another variant of Michael addition can produce tethered amine monomers when hydroxyalkyl acrylates react with N,N-dialkyl alkylenediamines. Thus, reaction of 2-hydroxyethyl acrylate with N,N-dimethyl propylenediamine yields the following monomer:

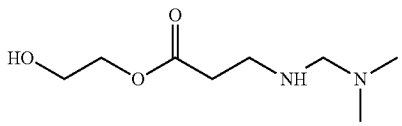

Replacing 2-hydroxyethyl acrylate with glycerol monoacrylate, trimethylolpropane monoacrylate, or pentaerythritol diacrylate will result in tethered amine diols.

In another embodiment, aminoalcohol monomers with tethered tertiary amino groups can be synthesized by reacting oxiranes (epoxides) with the aforementioned asymmetric dialkyl diaminoalkylenes:

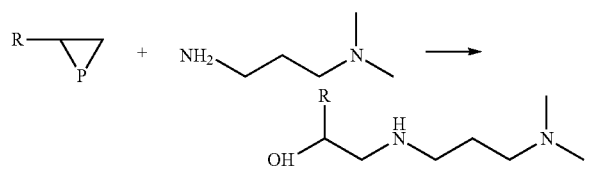

The tethered monomers described above may be used in polyurethane synthesis as chain extenders or as components of polyester or polyether polyol similar to VORANOL™ VORACTIV™ polyols from Dow. The latter can be used either in combination with tethered monomers or by themselves.

Tethered monomers described in this disclosure may also be used in combination with any other tertiary amino group (tethered or non-tethered) which can contain aliphatic, cycloaliphatic or aromatic substituents.

Cationic nature can also be imparted or improved by post-polymerization reactions such as, for example, reaction of epoxy quaternary ammonium compounds with carboxylic group of DMPA monomeric unit.

The number of tethered tertiary amino groups may be from 0.1 to about 15 or 20 milliequivalents per gram of urethane polymer. In one embodiment, the lower limit is 0.2, 0.3, 0.4, 0.5, or 0.6 milliequivalents/gram and the upper limit is about 10, 8, 5, 4, 3, 2, 1 or less than 1 milliequivalents per gram of urethane polymer. The number of tethered tertiary amino groups goes down as the groups are quaternized or neutralized with an acid (which makes them more effective in colloidally stabilizing the urethane dispersion in water). The number of tethered tertiary amino groups also goes down as nonionic and/or zwitterionic groups are added to the urethane polymer supplement the cationic stabilization effect for colloidal stabilization for the urethane dispersion in water. For the purpose of facilitating the calculation of the amount of tethered tertiary amino groups for the above ranges, if there are multiple tethered tertiary amino groups in one group tethered or terminal location from the urethane backbone, all of the tethered tertiary amino groups together will be counted as a single tethered tertiary amino group. Tethered tertiary amino groups will be counted the same irrespective of whether they are quaternized or neutralized with an acid component. In one example without any nonionic colloidal stabilization moieties, we found very effective colloidal stabilization using just 0.87 milliequivalents of tethered tertiary amino groups per gram of urethane polymer.

Quaternary Salts

The tertiary amine may be quaternized with any known quaternizing agent. Preferred quaternizing agents are alkyl halides, aralkyl halides, dialkyl carbonates, dialkyl sulphates and epoxides. Particularly preferred quaternizing agents include methyl chloride, ethyl chloride, benzyl chloride, methyl bromide, ethyl bromide, benzyl bromide, dimethyl sulfate, diethyl sulfate, ethylene oxide, propylene oxide, butylene oxide, styrene oxide and epichlorohydrin.

It is preferred that the tertiary amine groups are quaternized to some extent. In one embodiment, the extent of quaternization of the tethered and/or terminal tertiary amine group is >10 mole %, in another embodiment >20, ≥25 or >30, and in more preferred embodiments the extent of quaternization is >45 or >60 mole %. In preferred embodiment, at least 80, at least 85, at least 90 or at least 95 mole % of the tertiary amino groups are quaternized.

Salts

Tertiary amines can be neutralized to make cationic salts with virtually any acid. Examples of acid include acetic acid, formic acid, hydrochloric acid, phosphoric acid, sulfuric acid, nitric acid, nitrous acid, boric acid, carbonic acid, perchloric acid, acrylic acid, methacrylic acid, itaconic acid, maleic acid, 2-carboxyethyl acrylate, lactic acid, ascorbic acid, glycine, alanine, leucine, norleucine, phenylalanine, serine, taurine, valine, alpha-aminobutyric acid, palmitic acid, stearic acid, benzoic acid, mercaptoacetic acid, salicylic acid, pivalic acid, chloroacetic acid, dichloroacetic acid, trichloroacetic acid, citric acid, propionic acid, glycolic acid, 1-sulfonaphthalene, tartaric acid, phthalic acid, isophthalic acid, terephthalic acid, 5-sulfosalicylic acid, benzenesulfonic acid, cyclohexanecarboxylic acid, o-, m-, and p-toluic acid, o-, m-, and p-aminobenzoic acid, p-hydroxybenzoic acid, phenylacetic acid, methylbenzenesulfonic acid, butyric acid, valeric acid, oxalic acid, maleic acid, fumaric acid, malonic acid, succinic acid, glutaric acid, oleic acid, o-, m-, and p-chlorobenzoic acid, o-, m-, and p-bromobenzoic acid, anthranilic acid, o-, m-, and p-nitrobenzoic acid, adipic acid, caprylic acid, caproic acid, 1 lauric acid, fluoroacetic acid, capric acid, myristic acid, methoxyacetic acid, dodecanesulfonic acid, dodecylbenzenesulfonic acid, ethylbenzenesulfonic acid, octanesulfonic acid, hexanesulfonic acid, polyacrylic acid, copolymers of acrylic, methacrylic, itaconic, maleic, and fumaric acids.

It is preferred that the tertiary amine groups are neutralized prior to or during dispersion of the polyurethane in water to some extent. In one embodiment, the extent of neutralization of the tethered and/or terminal tertiary amine group is >10%, in another embodiment >20, ≥25 or >30 mole %, and in more preferred embodiments the extent of neutralization is >45 or >60 mole %. In preferred embodiment, at least 80, at least 85, at least 90 or at least 95 mole % of the tertiary amino groups are neutralized. Since multiple tertiary amino groups sometime inhibit the neutralization or quaternization of closely spaced adjacent tertiary amino groups, when we specify percent quaternization or neutralization, we will refer to the percent of groups quaternized or neutralized at one or more nitrogen atoms of the tethered or terminal group (not reducing the percent quaternization or neutralization due to inhibition of quaternization or neutralization due to close physical proximity). In another embodiment, excess acid over amine can be used.

Neutralization of tertiary amino groups (tethered or terminal) provides some benefits or quaternization when the acid used in neutralization can be volatilized or otherwise removed from the film or dried version of the polyurethane dispersion. After removal of a volatile or removable acid component from a neutralized tethered and/or terminal tertiary amine, the dried version of the polyurethane becomes less cationic and less hydrophilic, facilitating making a dried polyurethane with less water adsorption or cationic nature.

Combinations of quaternization and neutralization can be used.

In one embodiment, non-volatile acids, which impart permanent neutralization, can be used alone or in combination with fugitive acids. For example, some acids can impart hydrophobicity. Examples include stearic, hydroxystearic, linoleic, dimerate, abietic, sorbic, perfluorooctanoic and other similar acids. Dextrol™ free-acid phosphate surfactants represent another group of such acids.

Acids suitable for crosslinking include those with more than one acid group such as citric, tartaric, dimerate, phthalic, trimellitic, pyromellitic, itaconic, maleic, fumaric, glutaric, adipic, 1,2,3,4-butanetetracarboxylic (BTCA), ethylenediaminetetraacetic (EDTA), ethylene glycol tetraacetic (EGTA), 1,2-bis(o-aminophenoxy)ethane-N,N,N',N'-tetraacetic (BAPTA), 2-phosphonobutane-1,2,4-tricarboxylic, 5-sulfoisophthalic (5-SIPA), aspartic, glutamic, polyacrylic, polymethacrylic, polyitaconic acids, copolymers of maleic and fumaric acids, Carbosperse™ and Solsperse™ dispersants (Lubrizol), levulinic acid in combination with adipic or other diacid dihydrazide, and so forth. Other suitable acids include the acids used in making polyester polyols outlined below.

By using other acids, it is possible to impart other useful properties including but not limiting to:

Tetrabromophthalic acid—flame retardancy,

Phosphoric acid, isopropenyl phosphonic acid (IPPA), 2-phosphonobutane-1,2,4-tricarboxylic acid, amino tri-(methylene phosphonic acid), bis-(hexamethylene) triamine penta-(methylene phosphonic acid), diethylenetriamine penta-(methylene phosphonic acid), 1-hydroxyethylidene-1,1-diphosphonic acid, 2-hydroxy phosphonoacetic acid—flame retardancy and stability to thermal and light-induced oxidation, 3-Iodopropionic acid—biocidal, Acrylic, methacrylic and itaconic acids, beta-carboxyethyl acrylate (acrylic acid dimer), AMPS® (Lubrizol), sorbic, isopropenyl phosphoric acid—UV/EB cure, RAFT acid (e.g., S'-1-dodecyl-(S')-($\alpha,\alpha'$-dimethyl-$\alpha''$-acetic acid) trithiocarbonate) and diacid—acrylic-urethane (AU) hybrids. (RAFT—reversible addition-fragmentation transfer polymerization agent).

Hydrophobic properties to the coating by using aliphatic mono and polycarboxylic acids having 8 to 50 carbon such as stearic acid or hydroxystearic acid. More desirably the mono or polycarboxylic acids have from 12 to 36 carbon atoms.

Active-Hydrogen Containing Compounds

The term "active-hydrogen containing" refers to compounds that are a source of active hydrogen and can react with isocyanate groups via the following reaction:

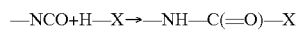

Such compounds typically range widely in molecular weight from 18 g/mol for water and 17 g/mol for ammonia to about 10,000 g/mol. They are customary divided into two subclasses depending on their molecular weight: Polyols with number-average molecular weight from about 500 to 10,000 g/mol and chain extenders with molecular weight from 18 to 500 g/mol. The extremes of the scale represent physical reality: High-molecular-weight polyols contribute to the soft segment and short chain extenders contribute to the hard segment of polyurethane; however, the exact position of the divider is somewhat arbitrary and can be moved depending on the circumstances. Both classes are reviewed below in more detail.

Polyols

The term "polyol" in the context of the present invention means any high molecular weight product ($M_n$>500 g/mol), typically referred to as a long-chain polyol, which has an active hydrogen that can be reacted with isocyanates and includes materials having an average of about two or more hydroxyl or other NCO-reactive groups per molecule.

Such long-chain polyols include polyether, polyester, polycarbonate and polycaprolactone polyols. Other examples include polyimide, polyester amide, polyacetal, polythioether, polysiloxane, ethoxylated polysiloxane, halogenated polyester and polyether, polybutadiene, hydrogenated polybutadiene, polyisoprene, polyisobutylene, alkyd-modified and polythioether polyols, hydroxyl-containing acrylic and methacrylic polymers and copolymers, hydroxyl-containing epoxies, and the like, and mixtures thereof. Combinations of different types of polyols may be used.

The polyether polyols, polyester polyols and polycarbonate polyols are preferred.

Polyether polyols are obtained in known manner by reaction of starting compounds that contain reactive hydrogen atoms, such as water or the diols set forth for preparing the polyester polyols, with alkylene oxides, such as ethylene oxide, propylene oxide, butylene oxide, styrene oxide, tetrahydrofuran, epichlorohydrin, and mixtures thereof. Preferred polyethers include polytetrahydrofuran (PTHF) and poly(propylene glycol) (PPG). Examples include Terathane® PTHF polyols from Invista and Acclaim™ PPG diols with lower monol contents from Arco Chemical.

Preferably polyether polyols provide less than about 25 wt. %, more preferably less than about 15 wt. % and most preferably less than about 5 wt. % poly(ethylene oxide) units in the backbone (main chain) based upon the dry weight of final polyurethane, since such main-chain poly(ethylene oxide) units tend to cause swelling of polyurethane particles in the waterborne polyurethane dispersion and also contribute to lower in-use (under wet or high-humidity conditions) tensile strength of articles made from the polyurethane dispersion.

The polyester polyols typically are esterification products prepared by the reaction of organic polycarboxylic acids or their anhydrides with a stoichiometric excess of a diol. Examples of suitable polyols for use in the reaction include polyglycol adipates, polyethylene terephthalate polyols, polycaprolactone polyols, orthophthalic polyols, sulfonated polyols, and the like, and mixtures thereof.

The diols used in making the polyester polyols can be aliphatic, cycloaliphatic or aromatic and include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, 2-butyl-2-ethyl prorane-1,3-diol, Versatic™ alcohols produced from CARDURA® E10P (Hexion), triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, polyether glycols, halogenated diols, and the like, and mixtures thereof. Preferred diols include ethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, tetrabromophthalic anhydride and acid, dimeric fatty acids such as oleic acid, and the like, and mixtures thereof. Preferred polycarboxylic acids used in making the polyester polyols include aliphatic or aromatic dibasic acids.

The preferred polyester polyol is a diol. Preferred polyester diols include hexane diol neopentyl glycol adipic acid polyester diol, e.g., Piothane™ 67-3000HNA (Panolam Industries) and Piothane 67-1000HNA; as well as propylene glycol maleic anyhydride adipic acid polyester diols, e.g., Piothane 50-1000OPMA; and hexane diol neopentyl glycol fumaric acid polyester diols, e.g., Piothane 67-500HNF. Other preferred polyester diols include Rucoflex™ S1015-35, S1040-35, and S-1040-110 (RUCO Polymer Corp.).

Polycarbonates include those obtained from the reaction of diols such 1,3-propanediol, 1,4-butanediol, 1,6-hexanediol, diethylene glycol, triethylene glycol, tetraethylene glycol, and the like, and mixtures thereof with diarylcarbonates such as diphenylcarbonate or phosgene.

Polysiloxane polyols are characterized by the presence of the —R$_1$R$_2$SiO— repeat units which can contain alkyl or aryl groups such as polydimethylsiloxanes, poly(dimethysiloxane-co-diphenylsiloxane)s, polydiphenylsiloxanes, poly(methylphenyl)siloxanes and the like, and combinations thereof. Examples include ethoxylated poly(dimethylsiloxane) (PDMS) Y-17256 from Momentive Performance Materials and side-chain PDMS diol MCR-C61 from Gelest.

Polyacetals include the compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6-hexanediol, and the like. Polyacetals can also be prepared by the polymerization of cyclic acetals.

Polyester amides and polyamides. Instead of long-chain polyols, long-chain amines may also be used to prepare the isocyanate terminated prepolymer. Suitable long-chain amines include polyester amides and polyamides, such as the predominantly linear condensates obtained from reaction of polybasic saturated and unsaturated carboxylic acids or their anhydrides and polyvalent saturated or unsaturated aminoalcohols, diamines, polyamines, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene di amine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-trimethylcyclohexane (isophorone diamine or IPDA), bis-(4-aminocyclohexyl)-methane, bis-(4-amino-3-methylcyclohexyl)-methane, ethylene diamine, diethylene triamine, triethylene tetramine, tetraethylene pentamine, and pentaethylene hexamine, and mixtures thereof. Other suitable diamines and polyamines include Jeffamine™ D-2000 and D-4000, which are amine-terminated polypropylene glycols, differing only by molecular weight, and which are available from Huntsman Chemical Company.

Chain Extenders

Chain extenders with the molecular weight from 18 to 500 g/mol such as aliphatic, cycloaliphatic or aromatic diols or amines can be used during the formation of the prepolymer and during the dispersion step of the process. Because the prepolymer is formed at elevated temperatures and in the general absence of water, the less reactive alcohol functionality is preferred for the prepolymer chain extension to provide for better control over the temperature and mixing.

On the other hand, during the dispersion stage of the process, chain extenders are competing with water for the reaction with the remaining NCO. In this case, the more reactive amine functionality is preferred.

For the prepolymer stage, the preferred chain extenders are the diol monomers used in making the polyester polyols described above. Any of the low-molecular-weight (less than 500 g/mol) polyols describes above may also be used as the prepolymer chain extenders.

In the most preferred embodiment of the present invention, no prepolymer chain extender is used.

As a dispersion chain extender, at least one of water, inorganic or organic polyamine having an average of about 2 or more primary and/or secondary amine groups or combinations thereof is suitable for use in this invention. Suitable organic amines for use as a dispersion chain extender are the same diamines and polyamines described above as monomers for preparing polyester amides and polyamides.

Preferred amine dispersion chain extenders include ethylene diamine (EDA), diethylene triamine (DETA), triethylene tetramine (TETA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof.

Suitable inorganic amines include hydrazine, substituted hydrazines, and hydrazine reaction products, and the like, and mixtures thereof. Ammonia ($NH_3$), if used as a neutralizer during the dispersion step, can also contribute to the consumption of the remaining NCO during the dispersion stage with the formation of terminal urea.

Polyalcohols are less preferred but can be used. Examples include those having from 2 to 12 carbon atoms, preferably from 2 to 8 carbon atoms, such as ethylene glycol, diethylene glycol, neopentyl glycol, butanediols, hexanediol, and the like, and mixtures thereof.

Preferred dispersion chain extender is water and ethylene diamine.

The amount of chain extenders typically ranges from about 0.3 to about 1.1 equivalents based on available isocyanate.

Water-Dispersability Enhancing Compounds

Polyurethanes are generally hydrophobic and not water-dispersible. Therefore, at least one water-dispersability enhancing compound (i.e., monomer), which has at least one, hydrophilic, ionic or potentially ionic group is included in the polyurethane polymers and prepolymers of this invention to assist dispersion of the polymer/prepolymer in water. In one embodiment of the present invention, the tethered amine monomer or its salt is this water-dispersability enhancing compound and its content is sufficient to prepare a stable dispersion without additional means.

In another embodiment of the present invention, an additional water-dispersability enhancing compound can be used especially if the content of the tethered amine monomer or its salt is insufficient to prepare a stable dispersion without additional means. These compounds may be of a nonionic, anionic, cationic or zwitterionic nature or the combination thereof. For example, anionic groups such as carboxylic acid groups can be incorporated into the prepolymer in an inactive form and activated by a salt-forming compound, such as tethered amine compound or an additional tertiary amine. Normally, carboxylic groups are introduced by hydroxy-carboxylic acids having the general formula (HO)$_x$Q(COOH)$_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, and the like, and mixtures thereof. Dihydroxy-carboxylic acids are more preferred with dimethylolproanoic acid (DMPA) and dimethylol butanoic acid (DMBA) being most preferred. Carboxylic acids can be converted into cationic centers by post-polymerization reactions such as, for example, reaction of epoxy quaternary ammonium compounds with carboxylic group of DMPA.

Water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

The amount of such side chain hydrophilic monomers can be as little as 10, or 6, or 3, or 2 or even 1% or less based on the weight of final polyurethane if enhanced colloidal stability is desired and as high as 20, or 30, or 40, or even 50% if water- or polar solvent-absorbing characteristics are required.

Preferred monomers are Tegomer® D-3403 from Evonik and Ymer N120 from Perstorp.

Additional suitable water-dispersability enhancing compounds include thioglycolic acid, 2,6-dihydroxybenzoic acid, sulfoisophthalic acid, polyethylene glycol, and the like, and mixtures thereof.

The optimum content of the additional water-dispersability enhancing compounds depends on the amount of tethered amine monomer present, its degree of neutralization and other target properties.

Although the use of water-dispersability enhancing compounds is preferred, dispersions of the present inventions can be prepared without them by using high-shear dispersing methods and stabilizing by cationic and nonionic surfactants.

Branching

Branching of the ultimate polymer product, as well as the prepolymer, can be optionally accomplished for aiding tensile strength and improving chemical resistance and resistance to creep—that is, recovery to that of or near its original length after stretching. In this regard, see U.S. Pat. No. 6,897,281. The preferred prepolymer branching monomers are trimethylolpropane and glycerol. The preferred dispersion branching monomers are diethylene triamine (DETA) and triethylene tetramine (TETA).

Crosslinkers

Compounds having at least one crosslinkable functional group can also be incorporated into the polyurethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include thioglycolic acid, 2,6-dihydroxybenzoic acid, melamine and its derivatives, multivalent metal compounds and the like, and mixtures thereof.

The amount of optional compounds having crosslinkable functional groups in the prepolymer will typically be up to about 1 milliequivalent, preferably from about 0.05 to about 0.5 milliequivalent, and more preferably from about 0.1 to about 0.3 milliequivalent per gram of final polyurethane on a dry weight basis.

Catalysts

Urethane prepolymer may be formed without the use of a catalyst but catalysis may be employed in some instances to reduce synthesis time or temperature. Examples of catalysts include organo-tin compounds, tertiary amines and transition metal compounds. Specific examples of suitable catalysts include stannous octoate, dibutyl tin dilaurate, and tertiary amine compounds such as triethylamine and bis-(dimethylaminoethyl) ether, morpholine compounds such as beta,beta-dimorpholinodiethyl ether, bismuth carboxylates, zinc bismuth carboxylates, iron (III) chloride, potassium octoate, potassium acetate and zirconium catalysts K-KAT® XC-9213 and K-KAT® 6212 from King Industries.

The preferred catalysts are DABCO® (diazabicyclo[2.2.2]octane), from Air Products, a mixture of 2-ethylhexanoic acid and stannous octoate, e.g., FASCAT® 2003 from Elf Atochem North America, and K-KAT XC-9213 from King Industries.

The amount of catalyst used to form the prepolymer will typically be from about 5 to about 200 parts per million of the total weight of prepolymer reactants.

The use of a catalyst is generally not necessary in the view that the tertiary amine compounds used in this invention act as catalysts.

Isocyanate Blocking Agents

Several types of compounds can be employed as blocking (a.k.a. protecting or masking) agents. Their function is to temporarily protect isocyanate groups from undesired reactions. The main requirement for the blocking compound is for its reaction with isocyanate to be reversible. When the reaction is reversed, the isocyanate group is regenerated and is available for further reactions. The reverse reaction can be triggered by physical or chemical means, for example, by elevated temperatures, radiation, vacuum, catalysts, compounds with active hydrogen, or combinations thereof.

Examples of blocking agents include oximes, phenols, alcohols, lactams, imidazoles, pyrazoles, acids, mercaptanes, imides, secondary amines, sulfites, acetoacetates and derivatives of malonic acid.

Oximes are generally preferred but can be replaced partially or in full by other blocking agents. Oximes can be represented by a general formula $CRR'=NOH$, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups. Examples of aldoximes include formaldoxime, acetaldoxime, propionaldoxime, butyraldoxime, benzaldoxime and the like. Examples of ketoximes include acetoxime, butanone oxime, cyclohexanone oxime, acetophenone oxime and the like.

Other preferred blocking agents include lactams, secondary and tertiary alcohols, pyrazoles and their mixtures. Some specific examples of other suitable blocking agents include dimethyl malonate, diethyl malonate, triazole, caprolactam, phenol and its derivatives, pyrazole, dimethylpyrazole, dibutylamine, diisopropylamine, tert-butanol, cyclohexanol, isopropanol and glycerine carbonate. Combinations of two or more blocking agents can be used if a stepwise reaction is desired, particularly mixtures of blocking agents which deblock at different temperatures.

The deblocking may occur during chain extension or during polymer drying and/or curing. Often it is preferred to use a blocking agent, which will evaporate from the polymer during drying or curing. In these cases, low molecular weight oximes such as acetoxime, butanone oxime, butyraldoxime and the like are preferred.

Solvents

Solvents, which are nonreactive to any significant extent in the context of the urethane-making reactions, may be used in the present invention but are not preferred because they introduce volatile organic component (VOC). The use of a solvent may be desirable to reduce the prepolymer viscosity, provide a heat sink, serve as refluxing medium and assist with film formation. Examples of solvents include substituted pyrrolidinones, amides, esters, ethers, ketoesters, ketones, glycolether-esters, hydrogenated furans, tertiary alcohols, aromatic and aliphatic hydrocarbons, chlorinated hydrocarbons, and the like, and mixtures thereof.

Specific examples include N-methyl-2-pyrrolidinone, N-ethyl-2-pyrrolidinone dimethylformamide, dimethylacetamide, acetone, methylethyl ketone, diisobutyl ketone, isobutylheptyl ketone, dimethylsulfoxide, N-methyl caprolactam, N-methyl valcrolactam, ethylene glycol monomethyl ether formal, and dipropylene glycol dimethyl ether.

The amount of solvent can vary in a broad range depending on the specifics of the polymer to be produced. About 0.1 to 30 parts by weight of solvent by weight of solvent per 100 parts by weight of the prepolymer can be used.

Solvents with a higher boiling point than water generally remain with the aqueous dispersion and facilitate the coalescence of the polymer particles during drying and film formation.

In some cases, it is desirable to remove at least a portion of the solvent from the dispersion. It can be done with solvents which have a lower boiling point than water. These solvents can be removed from the dispersion by, for example, distillation, vacuum distillation, isotropic distillation and thin-film evaporation.

Plasticizers

Plasticizer can optionally be used in order to render the viscosity of the polyurethane prepolymer low enough to process it as taught in U.S. Pat. No. 6,576,702 which is incorporated herein by reference, or to prevent the prepolymer from freezing during the dispersion step. The plasticizer can be added at any time during prepolymer preparation or before the prepolymer is dispersed in water, e.g., separately or as a mixture with one or more reaction components prior to prepolymer preparation. They can also be added after the dispersion is formed.

Use of a plasticizer as a diluent serves a number of important functions. First, use of other diluents (such as NMP, acetone and the like) is avoided or reduced, together with attendant fire, pollution and toxicity hazards of such other diluents and solvents. The plasticizer is used substantially in place of such other organic diluents and solvents, and most preferably completely in place of such other organic diluents and solvents. The maximum amount of such other organic diluents and solvents typically is less than about 20 wt. %, preferably less than about 10 wt. %, more preferably less than about 5 wt. %, and most preferably is about 0 wt. % of total prepolymer weight. Furthermore, solids content of the final product is increased, since the plasticizer remains in the final product and does not require a burdensome product purification process. Addition of plasticizer enhances polyurethane film formation during subsequent processing to form articles. Moisture resistance of the polyurethanes is enhanced, since most plasticizers are hydrophobic and tend to slow hydrolysis, especially of polyester-based polyurethanes.

Plasticizers may be selected for use in this invention according to parameters such as compatibility with the particular polyurethane and desired properties of the final composition. For example, polyester plasticizers tend to be more compatible with polyester-based polyurethanes.

Reactive plasticizers can be used that react with functionality of the ingredients. For example, epoxy groups may be present in reactive plasticizers that react with other compounds such as aminated, carboxylated and hydroxylated compounds. Ethylenic unsaturated groups may be present in reactive plasticizers to react with compounds having ethylenic unsaturation or be prone to oxidative curing. Other reactive groups in plasticizers include carbonyl and acetoacetoxy.

Plasticizers can also be selected to impart particular properties such as flame retardancy to the polyurethanes, or to enhance particular properties such as wetting, emulsifying, conditioning, and UV absorption in end-use applications.

The amount of plasticizers used can vary widely and can be anywhere from 1 to 200% based on prepolymer weight. Typically, at least 3% or more typically at least 5% is used. The preferred amount is at least 7% and the most preferred amount is at least 9%. The typical upper level is 100% and more typically 60%. The preferred amount is less than 40% and the most preferred amount is less than 30%. The optimum amount of plasticizer for applications such as wood coatings, plastic coatings, textile coatings, nonwovens, paper, gloves, personal care and the like is determined by the desired viscosity of the prepolymer, and the optimum amount of plasticizer is determined according to the particular application, as is well known to those skilled in the art.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex™ esters from Kalama Chemical), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl ($C_7/C_9$) benzyl phthalate, dimethoxyethyl phthalate, 7-(2,6,6,8-tetramethyl-4-oxa-3-oxo-nonyl) benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% Cl, o,p-toluenesulfonamide, N-ethyl p-toluene sulfonamide, N-cyclohexyl p-toluene sulfonamide, sulfonamide-formaldehyde resin, and mixtures thereof. Other suitable plasticizers known to those skilled in the art include castor oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Suitable dibenzoate esters include those set forth heretofore as well as the preferred p-aminobenzoic acid (PABA) esters, which are known to absorb UV (ultraviolet) radiation in the UVC band or region of the spectrum.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), alkyd derivatives, and the like, and mixtures thereof. Other suitable reactive plasticizers include epoxidized plasticizers, including certain monofuctional and polyfunctional glycidyl ethers such as Heloxy™ Modifier 505 (polyglycidyl ether of castor oil) and Heloxy™ Modifier 71 (dimer acid diglycidyl ether) from Shell Chemical Company, and the like, and mixtures thereof.

Examples of suitable flame retardant plasticizers include phosphorus-based plasticizers such as cyclic phosphates, phosphites, and phosphate esters, exemplified by Pliabrac™ TCP (tricresyl phosphate), Pliabrac TXP (trixylenyl phosphate), Antiblaze™ N (cyclic phosphate esters), Antiblaze TXP (tar acid, cresol, xylyl, phenol phosphates), and Antiblaze 524 (trixylyl phosphate) from Albright & Wilson Americas; Firemaster™ BZ 54 (halogenated aryl esters) from Great Lakes Chemicals; chlorinated biphenyl, 2-ethylhexyl diphenyl phosphate, isodecyl diphenyl phosphate (Santisizer® 148 from Ferro), C12-C16 alkyl diphenyl phosphate (Santisizer® 2148 from Ferro), triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as tris-(2-chloroethyl)-phosphate, tris-(2-chloroisopropyl)-phosphate, tris-(1.3-dichloro-2-propyl)-phosphate, chloro alkyl diphosphate ester (Antiblaze 100 from Albright & Wilson Americas); alkyl phosphates and phosphites such as tributyl phosphate, triisobutyl phosphate, tri-2-ethylhexyl phosphate, and triisoctyl phosphite; other organophosphates and organophosphites such as tributoxy ethylphosphate (KP-140 from Chempoint); other phosphates and phosphonates such as chlorinated diphosphate and chlorinated polyphosphonate; and the like. Mixtures can also be used.

Examples of suitable wetting, emulsifying, and conditioning plasticizers include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, and mixtures thereof.

Coalescents

Boiling point of coalescents is between those of solvents and plasticizers and is higher than boiling point of water. There is some overlap in these three categories and the division is somewhat artificial; in fact, solvents, coalescents and plasticizers form a continuum of boiling points. Coalescents tend to evaporate slower than water and remain with the polymer for an extended period of time facilitating film formation; however, at the end, they, like water, eventually also migrate out of the final product.

Examples of coalescent include ethylene glycol mono 2-ethylhexyl ether (EEH), dipropylene glycol monobutyl ether (DPnB), ethylene glycol monobutyl ether acetate (EBA), diethylene glycol monobutyl ether (DB), ethylene glycol monobutyl ether (EB), dipropylene glycol monomethyl ether (DPM), diethylene glycol monomethyl ether (DM).

Miscellaneous Additives

The polyurethane prepolymer, the product polyurethanes produced therefrom, and the aqueous prepolymer particle aqueous dispersions of the present invention as described above can be made with various additional ingredients and features in accordance with known polyurethane technology. Such additives include surfactants, stabilizers, defoamers, antimicrobial agents, antioxidants, rheology modifiers and the like and the mixtures thereof. They can optionally be added as appropriate before and/or during the processing of the dispersions of this invention into finished products as is well known to those skilled in the art.

Auxiliary Additives

A specific subclass of additives preferred in the context of the present invention is auxiliary additives which enhance the cationic nature and performance of the cationic urethanes. These include pigments, mordants, cationic and nonionic surfactants, fixatives, salts of multivalent metals and water soluble polymers.

Thus for ink jetprinting applications, one or more inorganic or organic pigments and/or resin particles can be incorporated in order to provide the ink-receptive layer with improved ink absorbency, dye fixability, dye-color-producing ability, blocking resistance and water resistance. Such pigments include mineral or porous pigments: kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone. Resin particles and porous particles of plastic pigments include polystyrene, urethane, urea, acrylic, melamine and benzoguanamine resins as well as hollow and porous particles composed of these resins.

Examples of water-soluble polymers include poly(vinyl alcohol) and derivatives, partially hydrolyzed poly(vinyl acetate), starch, oxidized starch, partially fermented starch, etherified starch, cellulose derivatives such as carboxymethylcellulose and hydroxyethylcellulose, casein, gelatin, soybean protein, high-acid-number acrylic, styrene-acrylic, styrene-maleic acid and diisobutylene-maleic acid copolymers, poly(diallyldimethylammonium chloride), poly(vinyl pyridine) and poly(vinyl pyrrolydone).

Additional quaternary ammonium compounds and surfactants are described by M. Dery in *Kirk-Othmer Encyclopedia of Chemical Technology.* 4$^{th}$ Edn, 1996, Vol. 20, pp. 739-767 which is incorporated herein by reference.

Examples of mordants include polyethyleneimines, polyamines and condensates of dicyandiamide.

In addition, one or more of various other additives can also be incorporated in the ink-receptive coating. These additives include thickening, parting, penetrating, wetting, thermal gelling, sizing, defoaming, antifoaming and blowing agents. Other additives include colorants, fluorescent whiteners, ultraviolet absorbers, oxidation inhibitors, quenchers, antiseptic agents, antistatic agents, crosslinking agents, dispersants, lubricants, plasticizers, pH adjusters, flow and leveling agents, setting promoters, and waterproofing agents.

Blends with Other Polymers

The dispersions of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982), the disclosures of which are incorporated herein by reference.

Hybrids (Vinyl/Acrylic)

Ethylenically unsaturated monomers and other free radically polymerizable monomers can be polymerized by conventional free radical sources to form a vinyl and/or acrylic polymer within the polyurethane particle to form a hybrid acrylic-urethane dispersion. Vinyl polymers is a generic term for polymers derived from substantial portions of unsaturated monomers or polymers derived from those monomers. Acrylic (often considered a subset of vinyl) will refer to acrylic acid, acrylates (being esters of acrylic acid), and alkacrylates such as methacrylates and ethacrylates and polymers therefrom. Additional free-radically polymerizable material (unsaturated monomers) may be added to the vinyl or acrylic monomers to copolymerize. These other monomers can be monomers such as maleic anhydride, maleic acid, and other monomers where the carbon-carbon double bond is nearly as reactive (and copolymerizable with) as a ethylenically unsaturated monomers. Dienes are considered ethylenically unsaturated and copolymerize with both the broad category of vinyl monomers and narrow category of acrylic monomers. It is anticipated that most of the monomers (e.g. >50 wt. %, more desirably >75 wt. % and preferably >85 wt. % of the total free-radically polymerizable monomers) will be vinyl or in narrower embodiments the acrylic monomers.

The polymerization within the polyurethane particles can be done by forming the aqueous dispersions of polyurethane composite and then polymerizing additional monomers by emulsion or suspension polymerization in the presence of these dispersions. Another way of making hybrid polymers is to include ethylenically unsaturated monomers in the polyurethane prepolymer (either with the reactants to form the prepolymer and/or any time before the urethane prepolymer is dispersed) and to cause these monomer to polymerize before, during and/or after the prepolymer is dispersed in aqueous medium. In one embodiment, the weight percent of polymer(s) from vinyl monomers based on 100 parts of combined urethane and vinyl (or acrylic in narrower embodiments) will be at least 1, 5, or 10 weight percent with the complementary amount of urethane prepolymer or polymer to make 100 parts by weight total. In another embodiment In another embodiment where small amounts of urethane prepolymer or polymer are desired the urethane prepolymer or polymer is at least 0.1, 0.5, 1, 5 or 10 weight percent of the combined weight and the vinyl (or acrylic in narrower embodiments) polymer is the complementary amount.

In one approach, the ethylenically unsaturated monomers act as a diluent during prepolymer formation. When the vinyl monomers are used as a diluent for the polyurethane component then the vinyl monomers will be from about 5 or 10 weight percent to about 50 weight percent of the combined weight of the polyurethane and vinyl component (monomer or polymer, depending on whether polymerization has occurred or not). Hybrids of polyurethanes of this invention with and acrylics can be made by any of these approaches. This type of technology is taught in U.S. Pat. No. 4,644,030; U.S. Pat. No. 4,730,021; U.S. Pat. No. 5,137,961; and U.S. Pat. No. 5,371,133. Another urethane-acrylic hybrid is often known as synthetic alloy urethane-acrylic where a urethane polymer is dispersed into a waterborne polymer dispersion or emulsion. This is taught in WO 98/38249 and U.S. Pat. No. 6,022,925.

Another approach for making aqueous dispersions containing urethane with tethered amine group is to form the polyurethane prepolymer and then disperse this prepolymer in an aqueous dispersion of the present invention. Alternatively, a prepolymer containing tethered amine groups of the present invention can be dispersed into aqueous dispersion of any other polymer.

Nanocomposites

It may be desirable to incorporate various nano-sized particulate solids into the polyurethane dispersions and dried products from the polyurethane dispersions of this invention. WO2006/079098 and U.S. Pat. No. 7,598,315 (equivalents) teach how to combine nanoparticles with urethane prepolymers in the absence or presence of water and how to blend various forms of the urethane with various fine particle forms of nanoparticles to achieve desirable combinations of urethanes and nano-particles.

Processes

Aqueous dispersions of polyurethane particles are made in accordance with this invention by forming the polyurethane prepolymer in the substantial absence of water and then dispersing this prepolymer in aqueous medium. This can be done in any fashion. Typically, prepolymer formation will be done by bulk or solution polymerizing the ingredients of the prepolymer.

Once the polyurethane prepolymer mixture is formed, it is dispersed in an aqueous medium to form a dispersion or a solution. Dispersing the prepolymer in aqueous medium can be done by any conventional technique, in the same way that other polyurethane prepolymers made by bulk or solution polymerization are dispersed in water. Normally, this will be done by combining the prepolymer blend with water with mixing. Where solvent polymerization is employed, the solvent and other volatile components can optionally be distilled off from the final dispersion, if desired. Where the prepolymer includes enough water-dispersability enhancing compound (such as cationic and optional nonionic monomers) to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation and less foaming.

Additional benefit of the compositions of the present invention over those disclosed in U.S. Pat. No. 6,140,412 is the significantly higher solids content possible.

In one embodiment, the dispersions of this invention typically have total solids (e.g., or i.e., polyurethane solids) of at least about 20 wt. %, preferably at least about 25 wt. %, and still more preferably at least about 30, 31.25, 35, or 40 wt. %.

The dispersions of this invention can be formed by dispersing the tethered amine prepolymer mixture in a previously formed aqueous dispersion of another polymer or polymers. In other words, the aqueous medium into which the prepolymer mixture is dispersed in accordance with the present invention can itself be a previously formed aqueous dispersion of another polymer or polymers including those made by emulsion and suspension polymerization techniques.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

Acetone process—A prepolymer is formed with or without the presence of acetone, MEK, and/or other polar solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.

Melt dispersion process—An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

Ketazine and ketimine processes—Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

Continuous process polymerization—An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

Reverse feed process—Water and optional neutralizing agent(s) and/or extender amine(s) are charged to the prepolymer under agitation. The prepolymer can be neutralized before water and/or diamine chain extender is added.

The polymers of the present invention can also be prepared by the two-prepolymer process leading to the formation of the core-shell and other morphologies as described in U.S. Pat. No. 7,582,698 which is incorporated herein by reference.

Applications

The compositions of the present invention and their formulations are useful in the ink-jet printing applications as paper receptive coatings, sizing agents and ink binders. They provide excellent printing ability and quality.

Another area of application is fiberglass sizing because cationic binders have excellent adhesion to anionic substrates. For the same reason, the polymers of the present invention can be tailored into adhesives and general paper sizing additives with improved properties.

Another application where cationic polymers are widely used is electrodeposition.

WORKING EXAMPLES

In order to more thoroughly describe this invention, the following working examples are provided. In these examples, the following reagents were used:

Acetic acid, glacial, from EMD
DBA—dibutylamine from Air Products and Chemicals
DeeFo 97-3—defoamer from Ultra Additives
DeeFo XHD-47J—defoamer from Ultra Additives
Dee Fo PI-40—defoamer from Ultra Additives
EDA—ethylenediamine
H12MDI—1,1'-methylenebis-(4-isocyanato cyclohexane) from Bayer Corporation as Desmodur® W
Diethanolamine from Aldrich Chemical Company, Inc.
DMPA—dimethylolpropanoic acid from Geo Specialty Chemicals Inc.
FASCAT® 2003—2-ethylhexanoic acid and stannous octoate from Elf Atochem North America
HCl—hydrochloric acid from J.T. Baker
HDI—hexamethylene diisocyanate
Hydrazine solution—35 wt. % solution in water from Bayer Corporation
IPDI—isophorone diisocyanate from Bayer Corporation.
Jeffcat® DPA—3-dimethylaminopropylamino-1,1'-bis-(propan-2-ol) from Hunstman
Jeffcat® ZF-10—N,N,N'-trimethyl-N'-hydroxyethyl-bisaminoethylether from Hunstman
MDI—diphenylmethylene diisocyanate
N-MeDEA—N-methyl diethanolamine from Alfa Aesar
Piothane 67-1000 HNA=poly(hexanediol neopentyl glycol adipate) polyester (Mn=1,000) from Panalom Industries.
PPG-1025—polypropylene glycol (average Mn=1025 g/mol) from Bayer Corporation
PPG-2025—polypropylene glycol (average Mn=2025 g/mol) from Bayer Corporation
PTHF 650—polytetrohydrofuran (average Mn=650 g/mol), Terathane® 650 from Invista
PTHF 1000—polytetrohydrofuran (average Mn=1,000 g/mol), Terathane® 1000 from Invista PTHF 2000—polytetrohydrofuran (average Mn=2,000 g/mol), Terathane® 2000 from Invista
PTHF 2900—polytetrohydrofuran (average Mn=2,900 g/mol), Terathane® 2900 from Invista
Tegomer® D-3403=trimethylolpropane monoethoxylate methyl ether (Mn=1,220 g/mol) from Evonik.
TDI—toluene diisocyanate
Ageflex® FM1Q80MC—N,N-dimethylaminoethyl methacrylate quaternized with methyl chloride from Ciba
Arquad® 16-29—trimethylhexadecylammonium chloride from Akzo Nobel
V-50®—2,2'-azo-bis-(2-methylpropionamidine) dihydrochloride from Aldrich
Methylene bis-acrylamide
Acrylamide
Styrene
Ethyl acrylate
tert-Butyl hydroxyperoxide
Erythorbic acid In addition, the following analytical and testing procedures were used in carrying out these examples:
Solids Content. Total solids were measured by Moisture/Solids Analyzer LabWare 9000™ (CEM Corporation).
pH. pH readings were taken using Acumet Basic pH Meter (Fisher Scientific).
Viscosity. Brookfield viscosity testing was performed using a Brookfield RV viscometer and spindles #3 to #6 (depending on viscosity) at 20 rpm and ambient temperature (~77° F.).
Particle Size. The particle size and size distribution of the dispersions were obtained by the following instruments: Submicron Particle Sizer AutodilutePAT Model 370 (NICOMP Particle Sizing Systems) using an intensity averaging with Gaussian distribution; Malvern Zetasizer Nano-S90 with data analysis by Zetasizer Software 6.12 and NanoTrak® particle size analyzer.
Isocyanate (NCO) Titration. A sample of prepolymer (about 3 grams) is weighted in a 250-ml Erlenmeyer flask. Toluene (50 ml) and 2M dibutylamine solution in toluene (20 ml) are added and the mixture is heated on a hot plate until the prepolymer completely dissolves. The flask is filled up to 200 ml with isopropanol. Bromophenol blue indicator (6-7 drops) is added, and solution is titrated with 1N HCl solution until the color changes from blue to light yellow.
Physical Properties. ASTM D882 "Standard Test Method for Tensile Properties of Thin Plastic Sheeting" was adopted for this test. Samples were tested for ultimate tensile and elongation on Instron® Model 4301 retrofitted and equipped with MTS ReNew Elite Controller run by TestWorks 4 software. The gap for the jaws was set to 1 inch, and test was performed at a rate of 2 inches per minute. The peak load and strain at break were recorded for each sample. Three to six measurements were performed for each sample and average result were reported.
Molecular Weight. Molecular weight distributions were measured on the Waters gel permeation chromatograph (GPC) equipped with Waters Model 515 Pump, Alcott Model 708 autosampler and Waters Model 2410 refractive index detector held at 40° C. The GPC conditions were: temperature—40° C., column set—2× Phenogel 5 u Linear (2)+50A Phenogel, 300×7.8 mm, mobile phase—tetrahydrofuran (THF) stabilized with 250 ppm butylated hydroxytoluene, flow rate—1.0 ml/min, injection volume—100 μl, sample concentration ~0.25%, and data acquisition using Waters Empower Pro Software. Approximately 0.05 gram of polymer was dissolved in 20 ml of stabilized HPLC-grade THF, filtered through a 0.45-micron polytetrafluoroethylene disposable filter (Whatman), and injected into the GPC. All samples were completely soluble in THF. The molecular weight calibration curve was established with EasiCal® polystyrene standards from Polymer Laboratories.

Evaluation of Cationic Polyurethane Dispersions in Ink-Jet Receptive Coating Formulations.

The following test procedures were used for evaluations.
Haze—Subjective rating from 1 to 5 given by comparing of the coatings made on an ultra-clear polyester film Melinex® 606 PET. A value of 5—best, given to ultra clear films; a value of 1 is worst and given to completely opaque films.
Gloss—Measured with a Gardner Haze Meter at a 60° angle on coatings made on Melinex 534 White Film. The higher value is better.
Water Resistance—Three drops of water were applied over a band of the primary, secondary, and black colors, allowed to stand for 10 seconds, rubbed with a finger, and dried. They were then subjectively compared and rated, with a rating of 5 representing no damage and a rating of 1 representing complete destruction of the image. The prints must be aged for a minimum of 48 hours after printing before testing to allow for dissipation of solvents in the ink, which will cause greater water damage if present.
Visual Density—The visual density of the primary colors (cyan, magenta, and yellow) and composite black were measured using the QEA PIAS II image analyzer. Density is a logarithmic measurement where a value of 1.0 means 90% of the light, 2.0 means 99%, etc. The higher numbers are better.
BIY Raggedness and Blur—The human eye does not see yellow well, and CMYK black is the darkest color. A straight line of black printed on a 100% coverage background of yellow is the hardest line to print without any bleeding or feathering of the line because in both cases the maximum amount of ink is printed. The BIY Raggedness is the average feathering or waviness of the black line measured in millimeters, and the BIY Blur is the average distance of the taper from maximum density to background, also measured in millimeters. These are also measured with the QEA PIAS II image analyzer.
L,a,b—L,a,b is a color space analysis of the background color of a coating or substrate. Generally, the L value indicates the intensity of the measurement, and the higher the L-value the better. The a-value represents the position on the red-green axis, and is not too important other than being close to zero makes color adjustments of prints on the substrate easier to achieve. The b-value represents the position on the blue-yellow axis, and is critical. A positive b-value represents a yellow background color, which is often unacceptable. So, a zero or negative b-value is desirable. The L,a,b values were measured with the QEA PIAS II image analyzer.
Mottle & Graininess—Ideally a solid image will have no variation in density. Graininess is the variation in image density on a small scale, in this case, in cells of 1.27 mm. Mottle is the variation of density from one cell of 1.27 mm to the adjacent cells. These are measured using the QEA PIAS II image analysis device using the small aperture (8 mm) for the graininess, and the large aperture (33 mm) for the mottle. The lower the values, the more uniform the print is.
Ink Drying Time—Determines how soon after printing a print can be handled and stacked. Solid bands of the primary colors (CMYK), the secondary colors (blue, green, and red), and CMYK black are printed on Epson R340 and Epson 4880 printers. As the prints emerge from the printer, they are blotted with copy paper to see if they offset. By measuring the print time and the length of visible offset, the drying time of the various colors and black can be gaged. This is recorded as seconds: the lower the number is the better (faster) the ink drying time.

Block resistance testing—To test for block resistance (drying), a coating sample is drawn down onto polyester film (8.5×11" Dura-Lar Clear from Grafix) for a coating weight of approximately 25 grams per square meter. A standard image is printed onto the coated polyester film without color management on an Epson Stylus C88+ printer using Dura Brite Ultra Ink. Immediately after the image has finished printing, a sheet of Boise X-9, 20 lb, 92 bright copy paper is used to test for ink dryness. The copy paper is placed over top of the dry-time bars on the printed sample and a 10.4-kg stainless steel roller (Manufactured by TMI, www.testing-machines.com, Model #61-04-01) is pulled across the top of the copy paper. When the copy paper is turned over, the level of ink dryness can be determined by comparing with a control sample based on how much ink transferred to the copy paper.

Wet rub testing—To test for wet rub resistance, the samples are prepared as described in the block resistance testing. The printed sample is dried for at least 24 hours before testing. Two stacked cotton Crockmeter Squares (Testfabrics, Inc.) moistened with one drop of DM water are wrapped around a finger and rubbed, with pressure, in one direction across the dry-time bars. Compare and rank the results in comparison with the control sample.

Dry rub testing—It is performed as the wet rub testing procedure dry Crockmeter Squares.

The following examples are presented to illustrate this invention:

Example 1

PPG 1025 (400 grams) and IPDI (321 grams) were reacted at 215-225° F. (102-107° C.) under a blanket of dry nitrogen for about an hour. The reaction mixture was cooled to 170° F. (77° C.), and 78 grams Jeffcat DPA were added. The reaction mixture was stirred at 175-185° F. (79-85° C.) for 40 minutes to produce an NCO-terminated prepolymer. The mixture was cooled to 123° F. (51° C.), and 43 grams of glacial acetic acid were added over 15 minutes with agitation. A portion (650 grams) of the neutralized prepolymer was added with mixing to 1,170 grams water at 53° F. (12° C.), which contained 0.8 grams of DEE FO PI-40, over the course of about 10-15 minutes to form an aqueous dispersion of cationic NCO-terminated polyurethane prepolymer. The remaining NCO was allowed to react with water overnight thereby producing a low-viscosity clean (no coagulum and floc) stable aqueous dispersion of cationic polyurethane having a total solids content of 36.8%, a pH of 7.1, and a mean diameter of particle size distribution of 53 nm (measured by Malvern and reported as intensity-average Gaussian distribution).

Comparative Example A

The same conditions as in Example 1 were used except that N-methyl diethanolamine was used instead of Jeffcat DPA. The following ingredients and amounts were used.

| Ingredient | Weight, g |
|---|---|
| PPG 1025 | 275 |
| IPDI | 404 |
| N-MeDEA | 81 |
| Acetic acid | 41 |
| Prepolymer portion dispersed | 650 |
| DEE FO PI-40 | 0.8 |
| Water | 1110 |

A very gritty dispersion was obtained which could not pass through a 75-micron filter sock.

Example 2

The same conditions as in Example 1 were used and the following ingredients and amounts were used.

| Ingredient | Weight, g |
|---|---|
| PTHF 1000 | 206 |
| H12MDI | 278 |
| Jeffcat DPA | 76 |
| Acetic acid | 40 |
| Prepolymer portion dispersed | 400 |
| DEE FO PI-40 | 0.4 |
| Water | 600 |

The obtained clean and stable aqueous dispersion of cationic polyurethane had 37.5% total solids content, pH 6.2, 34 cP Brookfield viscosity, and particle size smaller than detection range of the equipment (<20 nm).

Example 3

PTHF 1000 (1,536 grams), H12MDI (747 grams) and IPDI (633 grams) were reacted at 215-225° F. (102-107° C.) under a blanket of dry nitrogen for about an hour. The reaction mixture was cooled to 170° F. (77° C.), and 314 grams Jeffcat DPA were added. The reaction mixture was stirred at 175-185° F. (79-85° C.) for 40 minutes to produce an NCO-terminated prepolymer. The mixture was cooled to 145° F. (63° C.), and 69 grams of glacial acetic acid were added over 15 minutes with agitation. A portion (3,060 grams) of the partially neutralized prepolymer was added with mixing to 4,000 g water at 65° F. (18° C.), which contained 98 grams of glacial acetic acid and 5 grams of DeeFo 97-3, over the course of about 10-15 minutes to form an aqueous dispersion of cationic NCO-terminated polyurethane prepolymer. The remaining NCO was allowed to react with water overnight thereby producing a clean (no coagulum and floc) stable aqueous dispersion of cationic polyurethane having the following properties: total solids content—43.6%, a pH 4.7, and Brookfield viscosity—70 cP. Mean diameter of particle size distribution was 26 nm (measured by Malvern and reported as intensity-average Gaussian distribution). Weight-average molecular weight was measured at 42,500 g/mol. Ultimate tensile was measured at 3,750 psi (standard deviation=170 psi), elongation at break—620% (standard deviation=30%), and modulus at 100% elongation—1,025 psi (standard deviation=35 psi).

The resulting product of this example was compared with an anionic polyurethane dispersion Sancure® 861 available from Lubrizol in the ink jetprinting application. Dry and wet abrasion resistance, graininess and mottle for the cyan, magenta, yellow, and black inks were all superior for the cationic polyurethane of this example.

Example 4

The synthesis was conducted the same way as in Example 3 except for the following ingredients and amounts were used.

| Ingredient | Weight, g |
| --- | --- |
| PTHF 2000 | 446 |
| H12MDI | 141 |
| IPDI | 120 |
| Jeffcat DPA | 76 |
| Acetic acid | 16.8 + 20.4 |
| Prepolymer portion dispersed | 652 |
| DeeFo 97-3 | 1 |
| Water | 844 |

The obtained clean and stable aqueous dispersion of cationic polyurethane had the following properties: 44.3% total solids content, pH 5.6, 64 cP Brookfield viscosity, 34 nm mean particle size, 44,950 g/mol weight-average molecular weight, ultimate tensile—1,250 psi (standard deviation=90 psi), elongation at break—1,080% (standard deviation=70%), and modulus at 100% elongation—370 psi (standard deviation=40 psi).

Example 5

The synthesis was conducted the same way as in Example 3 except for the following ingredients and amounts were used.

| Ingredient | Weight, g |
| --- | --- |
| PTHF 2900 | 490 |
| IPDI | 217 |
| Jeffcat DPA | 76 |
| Acetic acid | 16.8 + 20.4 |
| Prepolymer portion dispersed | 670 |
| DeeFo 97-3 | 1 |
| Water | 844 |

The obtained clean and stable aqueous dispersion of cationic polyurethane had 45.0% total solids content, pH 5.3, 58 cP Brookfield viscosity, 45 nm mean particle size, and 79,100 g/mol weight-average molecular weight.

Example 6

The synthesis was conducted the same way as in Example 3 except for the following ingredients and amounts were used.

| Ingredient | Weight, g |
| --- | --- |
| PTHF 650 | 243 |
| H12MDI | 156 |
| IPDI | 132 |
| Jeffcat DPA | 57 |
| Acetic acid | 12.6 + 12.6 |
| Prepolymer portion dispersed | 400 |
| DeeFo 97-3 | 0.6 |
| Water | 519 |

The obtained clean and stable aqueous dispersion of cationic polyurethane had the following properties: 41.8% total solids content, pH 6.0, 60 cP Brookfield viscosity, 25 nm mean particle size, ultimate tensile—4,400 psi (standard deviation=30 psi), elongation at break—420% (standard deviation=40%), and modulus at 100% elongation—1,800 psi (standard deviation=80 psi).

Example 7

The synthesis was conducted the same way as in Example 1 except for the following ingredients and amounts were used.

| Ingredient | Weight, g |
| --- | --- |
| PTHF 1000 | 343 |
| H12MDI | 344 |
| Jeffcat DPA | 74 |
| Acetic acid | 38.7 |
| Prepolymer portion dispersed | 690 |
| DEE FO PI-40 | 0.57 |
| Water | 913 |

The obtained clean and stable aqueous dispersion of cationic polyurethane had 40.9% total solids content, pH 6.6, 42 cP Brookfield viscosity, and 30 nm mean particle size.

Example 8

The same conditions as in Example 3 were used and the following ingredients and amounts were used.

| Ingredient | Weight, g |
| --- | --- |
| PPG 1025 | 345 |
| IPDI | 210 |
| Jeffcat DPA | 35 |
| Acetic acid | 7.6 + 7.6 |
| Prepolymer portion dispersed | 410 |
| DeeFo 97-3 | 0.6 |
| Water | 680 |

The obtained clean and stable aqueous dispersion of cationic polyurethane had 39.3% total solids content, pH 5.8, 45 cP Brookfield viscosity, and 58 nm mean particle size.

Comparative Example B

The same conditions as in Example 8 were used except that N-methyl diethanolamine was used instead of Jeffcat DPA. The following ingredients and amounts were used.

| Ingredient | Weight, g |
| --- | --- |
| PPG 1025 | 295 |
| IPDI | 260 |
| N-MeDEA | 38 |
| Acetic acid | 7.6 + 7.6 |
| Prepolymer portion dispersed | 400 |
| DeeFo 97-3 | 0.6 |
| Water | 530 |

The initially obtained white milky dispersion destabilized and coagulated into a solid white mass in about 3 hours.

Example 9

The same conditions as in Example 3 were used and the following ingredients and amounts were used.

| Ingredient | Weight, g |
| --- | --- |
| PPG 1025 | 370 |
| IPDI | 200 |
| Jeffcat DPA | 23 |
| Acetic acid | 5.1 + 5.1 |
| Prepolymer portion dispersed | 400 |
| DeeFo 97-3 | 0.6 |
| Water | 540 |

The obtained stable aqueous dispersion of cationic polyurethane had 43.2% total solids content, pH 5.6, 42 cP Brookfield viscosity, and 640 nm mean particle size. About 7 grams of wet coagulum was filtered out by a 75-micron sock filter.

Comparative Example C

The same conditions as in Example 9 were used except that N-methyl diethanolamine was used instead of Jeffcat DPA. The following ingredients and amounts were used.

| Ingredient | Weight, g |
| --- | --- |
| PPG 1025 | 340 |
| IPDI | 230 |
| N-McDEA | 25 |
| Acetic acid | 5.1 + 5.1 |
| Prepolymer portion dispersed | 420 |
| DeeFo 97-3 | 0.6 |
| Water | 560 |

The obtained white milky dispersion was filtered through a 75-micron sock filter about half-hour after preparation. The filtration was very slow and about 20 grams of coagulum was collected by the filter. In four hours, the dispersion completely destabilized and coagulated into a solid white mass. A portion of the dispersion was diluted from 42% theoretical solids content down to 34% by DM water after filtration. The diluted dispersion solidified in 8 hours after the dispersion was made.

Example 10

The same conditions as in Example 1 were used except that Jeffcat ZF-10 was used instead of Jeffcat DPA. The following ingredients and amounts were used.

| Ingredient | Weight, g |
| --- | --- |
| PPG 1025 | 288 |
| IPDI | 170 |
| Jeffcat ZF-10 | 43 |
| Acetic acid | 27 |
| Prepolymer portion dispersed | 330 |
| DEE FO PI-40 | 0.4 |
| Water | 560 |

The obtained clean and stable aqueous dispersion of cationic polyurethane had 35.1% total solids content, pH 6.8, 25 cP Brookfield viscosity, and 65 nm mean particle size.

The product of this example demonstrated a unique property better described as non-cohesive adhesive. Films made from this polymer have very good blocking resistance, i.e., no cohesion, and yet they readily adhere to a variety of substrates such as glass and skin. This is probably the result of relatively high content of hard segment and cationic nature of the polymer with the amine located at the chain ends.

Example 11

The cationic polyurethane dispersion from Example 10 was used to prepare an acrylic-urethane hybrid with ultra-low free surfactant content and very narrow particle size distribution according to the following procedure.

To a 5-L four-necked glass flask submerged into a water bath and equipped with a stirrer, reflux condenser, thermometer and nitrogen inlet tube, were added 1800 grams DM water and 21 grams of dispersion from Example 11. In a nitrogen atmosphere, the temperature of the vessel contents was brought to 72° C. and the initiator solution of 3.7 grams V-50 in 44 grams DM water was added. Immediately after, the addition of the following monomer pre-emulsion mixture was started over the period of 2.5 hours: 375 grams DM water, 21 grams methylene bis-acrylamide, 3.8 grams Arquad 16-29, 14 grams acrylamide, 4.6 grams Ageflex FM1Q80MC, 248 grams styrene and 1200 grams ethyl acrylate. At the same time, 11 grams V-50 solution in 445 grams DM water started to be added at a constant rate over the period of 3.5 hours. The temperature was maintained at 72° C. for 4 hours. Half-hour after V-50 solution ran out, the contents were cooled to 57° C., and the solution of 1.6 grams 70% tert-butyl hydroxyperoxide and 0.5 gram Arquad 16-29 in 4.5 grams DM water was added. After 20 minutes of mixing, solution of 2.2 grams erythorbic acid in 46 grams DM water as added.

The resulting water-thin aqueous dispersion of cationic acrylic-polyurethane hybrid had the following properties: Total solids content—34.8%, pH 4.1, particle size—216 nm (PDI=1.1). Glass transition temperature was measured at +11° C.

Example 12

Prophetic Hybrid Acrylic-Urethane Based on Examples 1, 3, 9, 10

During execution of any of the above inventive examples, in particular, Examples 1, 3, 4, 9 and 10, free-radically polymerizable monomers and their mixtures can be added to the prepolymer at any point of its preparation, such as before or after the prepolymer is dispersed into water. The most commonly used monomers are methyl methacrylate, ethyl acrylate, butyl acrylate, acrylonitrile, and styrene. The amount of added monomers is typically from about 5 to about 70% wt. based on the weight of the prepolymer. For example, about 20 to 50% wt of the 50:50 by wt. blend methyl methacrylate-butyl acrylate mixture can be used. Addition of small amounts of polymerization inhibitors such as BHT and blanketing of the prepolymer with the oxygen-depleted air is beneficiary to the safety and reliability of the operations. After the prepolymer diluted with monomers is dispersed into water according to the teaching of this invention, the free-radical polymerization can be imparted by the use of free-radical initiators in particular by redox combinations which allow for conducting polymerization at moderate temperatures. Traditional redox systems are based on such peroxides as tert-butyl hydroperoxide, hydrogen peroxide and sodium persulfate and such reducing agents as sodium bisulfate, erythorbic acid, sodium formaldehyde sulfoxylate, Bruggolite™ FF6 from Bruggemann Chemicals, tetramethyl ethylenediamine and mercaptanes. Accelerators such as iron-containing compounds can also be used.

Additional unsaturated monomers can be added any time after the prepolymer is dispersed into water.

The described procedure will result in aqueous dispersions of cationic vinyl-urethane hybrid with high total solids content and low viscosity.

Example 13

PTHF 1000 (279 grams), H12MDI (136 grams) and IPDI (115 grams) were reacted at 215-225° F. (102-107° C.) under a blanket of dry nitrogen for about an hour. The reaction mixture was cooled to 170° F. (77° C.), and 57 grams Jeffcat DPA were added. The reaction mixture was stirred at 175-185° F. (79-85° C.) for 40 minutes. The mixture was cooled to 150° F. (66° C.), nitrogen purge was removed from the head space, and 65 grams methylmethacrylate were added followed by 13 grams of glacial acetic acid. A portion (420 grams) of the partially neutralized prepolymer was added with mixing to 830 g water at 65° F. (18° C.), which contained 13 grams of glacial acetic acid and 0.6 grams of DeeFo 97-3, over the course of about 10-15 minutes to form an aqueous dispersion. After ~50 minutes of mixing, 7 grams of 3.5% tBHP solution was added under a blanket of nitrogen and mixed for 10 minutes. Then 11 grams of 2% solution of erythorbic acid were mixed in. After 1 hour, additions of tBHP and erythorbic acid were repeated. After remaining NCO was allowed to react with water overnight at 50° C., a clean (no coagulum and floc) stable aqueous dispersion was produced having the following properties: total solids content—31.9%, a pH 5.6, and Brookfield viscosity—10 cP, mean diameter of particle size distribution—34 nm (measured by Malvern and reported as intensity-average Gaussian distribution), residual methylmethacrylate—400 ppm.

Example 14

The same conditions as in Example 13 were used except that styrene was used instead of methylmethacrylate. A clean stable aqueous dispersion was produced having the following properties: total solids content—31.7%, a pH 5.6, and Brookfield viscosity—8 cP, mean diameter of particle size distribution—37 nm (measured by Malvern and reported as intensity-average Gaussian distribution), residual styrene—200 ppm.

Example 15

The same conditions as in Example 13 were used except that, in addition to methylmethacrylate, 65 grams butyl acrylate was added. A clean stable aqueous dispersion was produced having the following properties: total solids content—31.2%, a pH 5.8, and Brookfield viscosity—8 cP, mean diameter of particle size distribution—39 nm (measured by Malvern and reported as intensity-average Gaussian distribution), residual butyl acrylate—150 ppm, and no detectable methylmethacrylate.

Example 16

PTHF 1000 (217 grams), Tegomer D-3403 (150 grams), and IPDI (203 grams) were reacted at 190-205° F. (88-96° C.) under a blanket of dry nitrogen for about an hour. The reaction mixture was cooled to 140° F. (60° C.), and 29 grams Jeffcat DPA were added. The reaction mixture was stirred at 175-185° F. (79-85° C.) for 40 minutes to produce an NCO-terminated prepolymer. The mixture was cooled to 140° F. (60° C.), and a portion (400 grams) of the prepolymer was added with mixing to 650 grams water at 70° F. (21° C.), which contained 0.6 grams of DEE FO 97-3, over the course of about 5 minutes to form an aqueous dispersion. The remaining NCO was allowed to react with water at 95-105° F. (35-41° C.), thereby producing a stable aqueous dispersion of nonionically stabilized cationic polyurethane having a total solids content of 39.4%, a pH of 8.4, B.V. of 55 cP, and a mean diameter of particle size distribution of 59 nm (measured by Malvern and reported as intensity-average Gaussian distribution).

The resulting nonionically stabilized cationic dispersion of this example was compared with an anionic polyurethane dispersion Sancure® 861 available from Lubrizol and the product of Example 3 in the ink-jet printing application. The image density for the cyan, magenta, yellow, and black inks and block resistance were all superior for the polyurethane on this example.

Example 17

The following materials were charged to a reactor: Piothane 67-1000 HNA (109.9 grams), Tegomer D3403 (376.2 grams) and Desmodur W (274.2 grams). The mixture was slowly heated to 104.4° C. (220° F.) and maintained at this temperature for 60 minutes. The reaction mixture was cooled to 80° C. (176° F.). Jeffcat DPA (23.5 grams) was added over 10 minutes and the reaction mixtures was raised and maintained at 90° C. (194° F.) for 60 minutes. The remaining isocyanate (NCO) was found to be 5.39% by titration with DBA and 1.0M HCl. The reaction mixture was cooled to 80° C. (176° F.) followed by addition of diethyl sulfate (16.2 grams) over 10 minutes. The reaction mixture was maintained at 80° C. (176° F.) for about 60 minutes. A portion of the prepolymer (628 grams) was charged over the course of about 10 minutes into another reactor containing water (1422 grams) at 20° C. (68° F.). When the dispersion of the prepolymer was complete, chain extension via reaction with water was allowed to proceed by allowing the reaction mixture to stir for overnight.

Dispersion properties: Total Solids=30.5%, pH=8.28, Brookfield viscosity=50 cP, particle size=30.3 nm.

Example 18

The following materials were charged to a reactor: Terethane® 2000 (342.5 grams), Tegomer D3403 (154.2 grams), Desmodur W (222.3 grams), pentaerythritol distearate (30.8 grams) and Jeffcat DPA (21.1 grams). The mixture was slowly heated to 104.4° C. (220° F.) and maintained at this temperature for 110 minutes. The remaining isocyanate (NCO) was found to be 3.59% by titration with DBA and 1.0M HCL. The reaction mixture was cooled to 71° C. (160° F.) followed by addition of diethyl sulfate (29.1 grams) over 10 minutes. The reaction mixture was maintained at 71° C. (160° F.) for about 35 minutes.

A portion of the prepolymer (638 grams) was charged over the course of about 15 minutes into another reactor containing water (1382.7 grams) at 20° C. (68° F.). When dispersion of the prepolymer was complete, ethylenediamine 16.7% in water (58.9 grams) was added over 30 minutes. The reaction mixture was allowed to stir overnight. Dispersion properties: Total Solids=30.6%, pH=7.28, Brookfield viscosity=14 cP, particle size=59.5 nm.

Example 19

To the dispersion of Example 3 containing 20 grams of dry solids, 0.06 gram of aqueous 25% phosphoric acid was added. A 10-mil wet coating was applied onto a Mylar P300-7C sheet and air-dried overnight. Accelerated heat aging was conducted for 60 minutes in convection oven at 149° C. (300° F.). Unmodified dispersion from Example 3 was used for comparison. L-value (measure of whiteness) for unheated films was measured at 73.8. After aging for 1 hour at 300° F., L-value for comparative film was 63.4, and for the film with phosphoric acid, L-value was measured at 72.1. This example demonstrates high efficiency of small amounts of phosphoric acid in heat stabilization of cationic polyurethane.

While certain representative embodiments and details have been shown for the purpose of illustrating the subject invention, it will be apparent to those skilled in this art that various changes and modifications can be made therein without departing from the scope of the subject invention.

What is claimed is:

1. An ink receptive substrate coated with an aqueous cationic polyurethane composition comprising an aqueous dispersion of a polyurethane having a polyurethane backbone segment with one or more tethered tertiary amino groups laterally attached to said backbone segment wherein said tertiary amino groups are optionally partially or fully neutralized or quaternized and wherein said tertiary amine groups are separated from said polyurethane backbone by at least two intervening atoms in their tethering group.

2. An ink receptive substrate according to claim 1, wherein the substrate is a nonwoven or textile.

3. An ink receptive substrate according to claim 2, wherein the substrate is paper.

4. An ink receptive substrate according to claim 1, wherein the substrate is a polymeric film.

5. An ink receptive substrate according to claim 1, wherein the tethered tertiary amino groups are incorporated into the polyurethane by reacting at least one tertiary amino group compound having about two isocyanate-reactive hydrogens during the synthesis of said polyurethane and wherein said neutralized or quaternized tethered tertiary amino groups form cationic groups.

6. An ink receptive substrate according to claim 1, wherein said polyurethane backbone also comprises repeat units from reacting a polyol having two or more isocyanate-reactive hydrogens, wherein said polyol comprises at least one polyester polyol, polycarbonate polyol, or polyether polyol.

7. An ink receptive substrate according to claim 1, wherein said polyurethane further comprises nonionic or zwitterionic colloidal stabilizing moieties attached to said polyurethane.

8. An ink receptive substrate according to claim 1, wherein said tethered tertiary amino groups are present in amounts from about 0.1 to about 10 milliequivalents per gram of polyurethane.

9. An ink receptive substrate according to claim 1, wherein said tethered tertiary amino groups are present in amounts from about 0.3 to about 3 milliequivalents per gram of polyurethane.

10. An ink receptive substrate according to claim 5, wherein said at least one tertiary amino group compound with comprises 3-dimethylaminopropylamino-1,1'-bis-(propan-2-ol) or N,N,N'-trimethyl-N'-hydroxyethylbisaminoethylether.

11. An ink receptive substrate according to claim 1, wherein at least 25% of said tethered tertiary amino groups are neutralized to form cationic centers.

* * * * *